United States Patent
Fadler et al.

(10) Patent No.: US 7,746,983 B2
(45) Date of Patent: Jun. 29, 2010

(54) DISTRIBUTOR WITH A TEST ACCESS

(75) Inventors: Georges Fadler, Kleinmachnow (DE); Jörg Franzke, Berlin (DE)

(73) Assignee: ADC GmbH, Berlin (DE)

( * ) Notice: Subject to any disclaimer, the term of this patent is extended or adjusted under 35 U.S.C. 154(b) by 167 days.

(21) Appl. No.: 10/547,318

(22) PCT Filed: Feb. 19, 2004

(86) PCT No.: PCT/EP2004/001565

§ 371 (c)(1),
(2), (4) Date: Mar. 29, 2006

(87) PCT Pub. No.: WO2004/080044

PCT Pub. Date: Sep. 16, 2004

(65) Prior Publication Data

US 2006/0177042 A1 Aug. 10, 2006

(30) Foreign Application Priority Data

Mar. 8, 2003 (DE) ................................ 103 10 208

(51) Int. Cl.
*H04M 1/24* (2006.01)
*H04M 3/08* (2006.01)
*H04M 3/22* (2006.01)

(52) U.S. Cl. .............. 379/27.01; 379/27.06; 379/29.01; 379/327

(58) Field of Classification Search ....... 379/1.01–1.04, 379/9, 15.01, 17, 27.01, 27.05, 27.06, 27.07, 379/29.01, 325–328, 26.01, 399.01, 412
See application file for complete search history.

(56) References Cited

U.S. PATENT DOCUMENTS

| 4,741,711 | A | * | 5/1988 | Singer, Jr. .............. 439/620.26 |
| 6,272,219 | B1 | * | 8/2001 | De Bruycker et al. .. 379/399.01 |
| 6,434,221 | B1 | | 8/2002 | Chong |
| 6,453,014 | B1 | * | 9/2002 | Jacobson et al. ......... 379/26.01 |
| 6,785,325 | B1 | * | 8/2004 | Liu et al. ..................... 375/220 |
| 7,177,394 | B2 | * | 2/2007 | Arias et al. ................ 379/1.03 |

FOREIGN PATENT DOCUMENTS

| DE | 201 04 605 | 5/2001 |
| EP | 0 647 071 | 4/1995 |

(Continued)

*Primary Examiner*—Quoc D Tran
(74) *Attorney, Agent, or Firm*—Merchant & Gould P.C.

(57) ABSTRACT

The invention relates to a distribution frame (1) for telecommunications and data technology, the distribution frame (1) having a system side and a subscriber side, which are each formed by at least one distribution frame connection module (2, 3), the distribution frame connection modules (2, 3) each having a jumper side by means of which the electrical connections between the system side and the subscriber side can be changed, comprising an access matrix (15) by means of which the electrical connections are routed between the system side and the subscriber side, the electrical connection being passed on by means of the access matrix (15) or else being connected to a test unit (16) via a test bus (17), the access matrix (15) being arranged in the distribution frame connection module (3, 2) on the subscriber side or the system side, and to a distribution frame connection module (2, 3) suitable for this purpose.

10 Claims, 3 Drawing Sheets

FOREIGN PATENT DOCUMENTS

Figure 5:
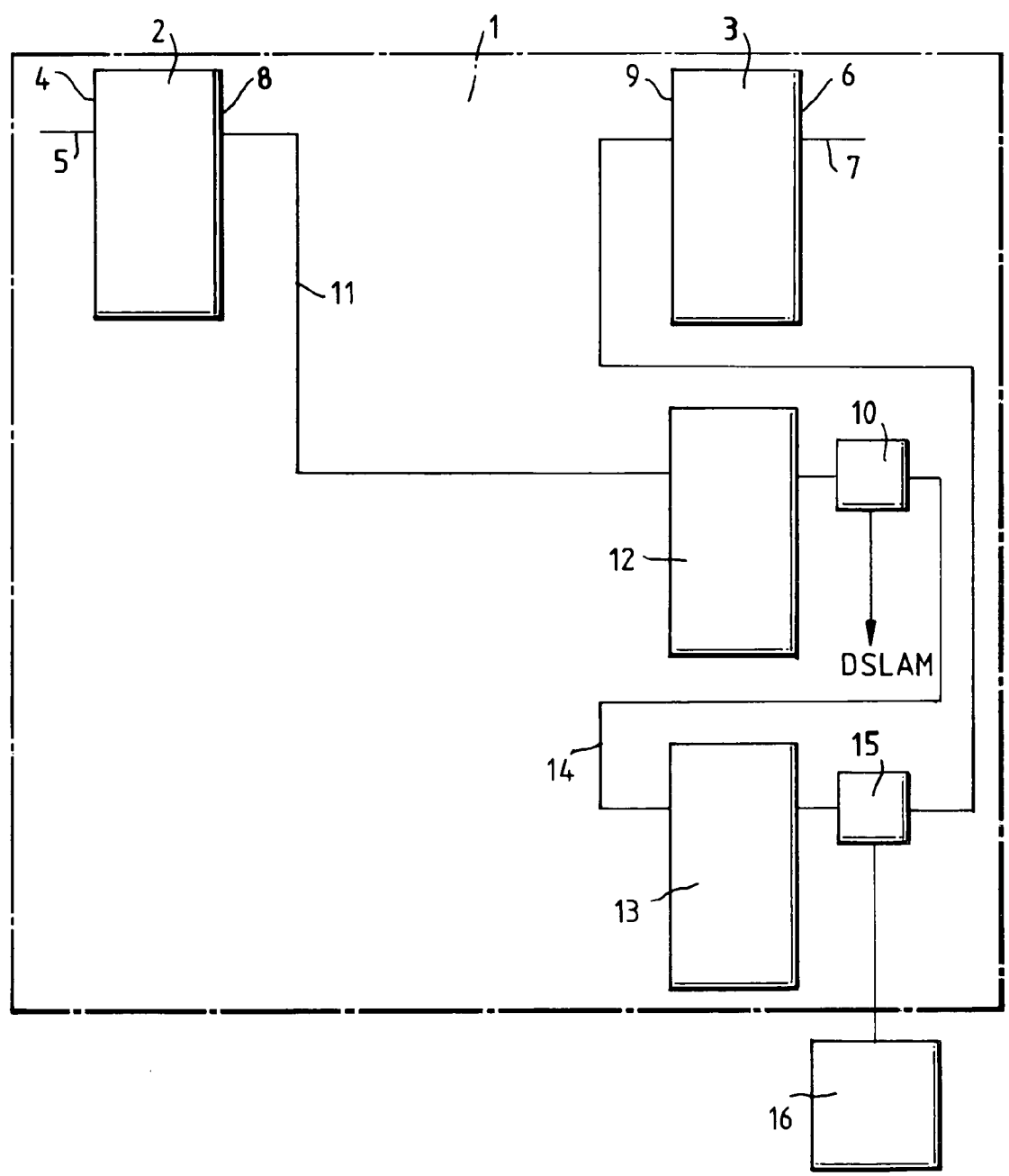

| | | |
|---|---|---|
| EP | 1 102 497 | 5/2001 |
| WO | WO 99/14917 | 3/1999 |
| WO | WO 99/36987 | 7/1999 |
| WO | WO 9953643 | * 10/1999 |
| WO | WO 01/93548 | 12/2001 |
| WO | WO 01/97339 | 12/2001 |
| WO | WO 03/079599 | 9/2003 |

* cited by examiner

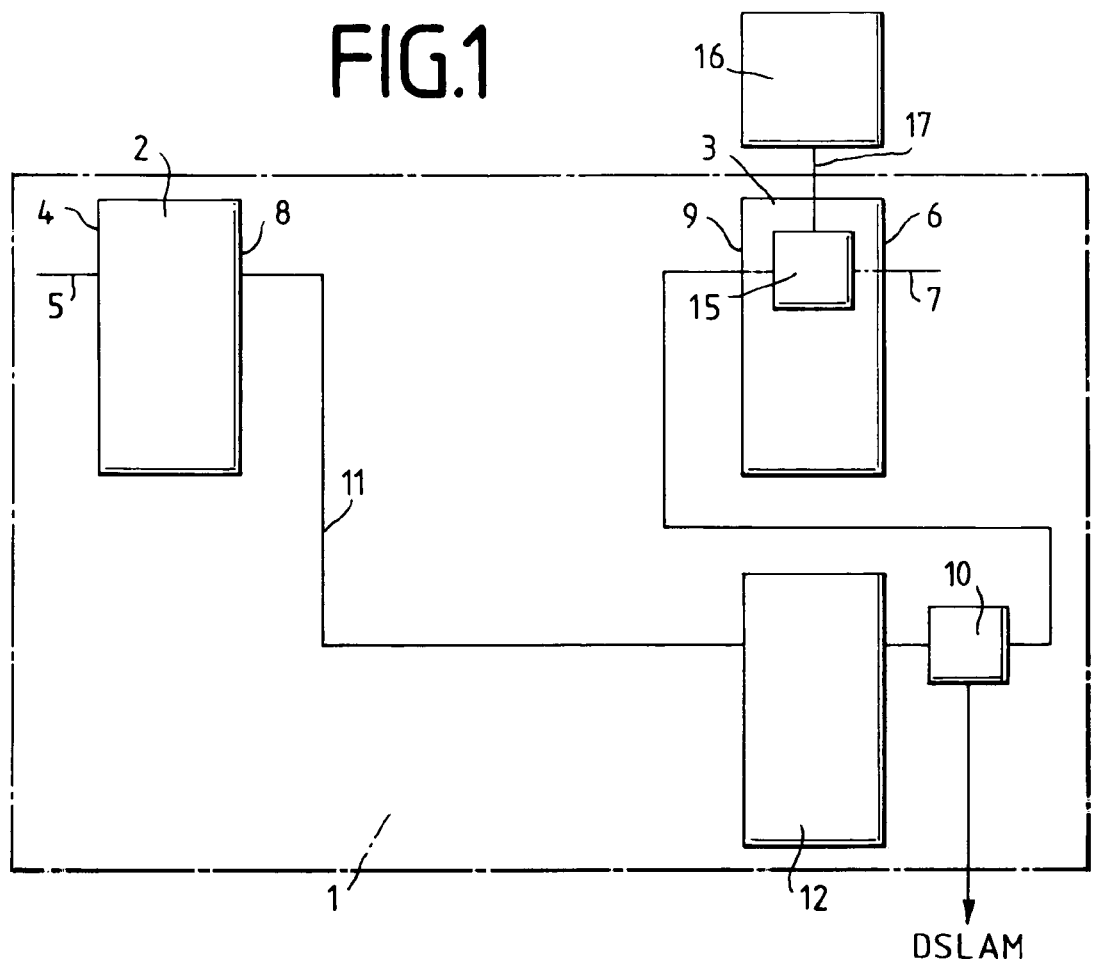
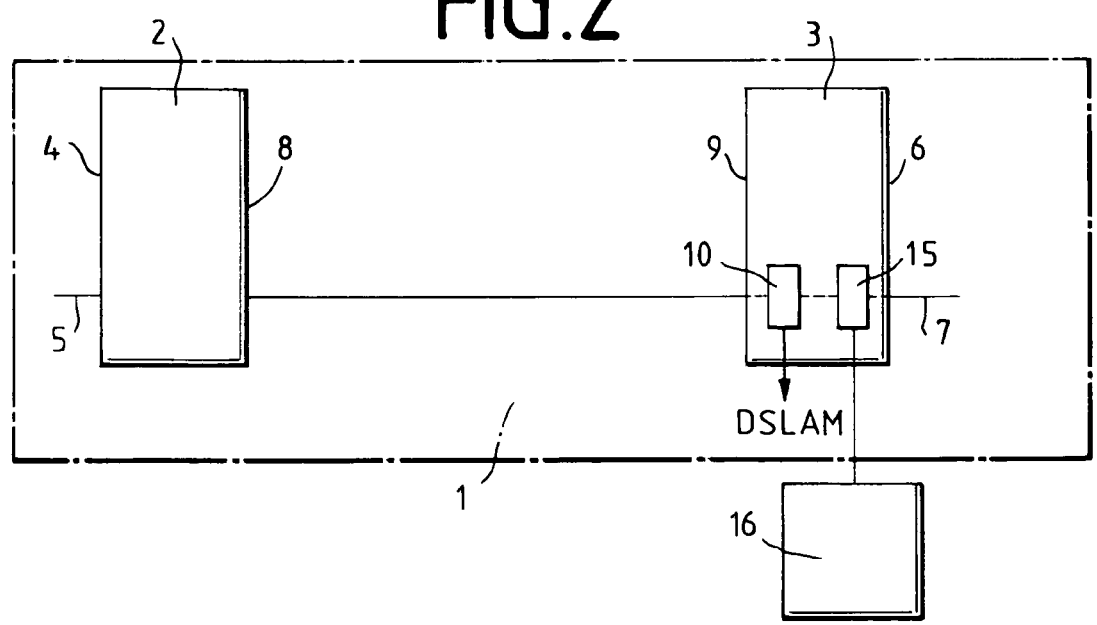

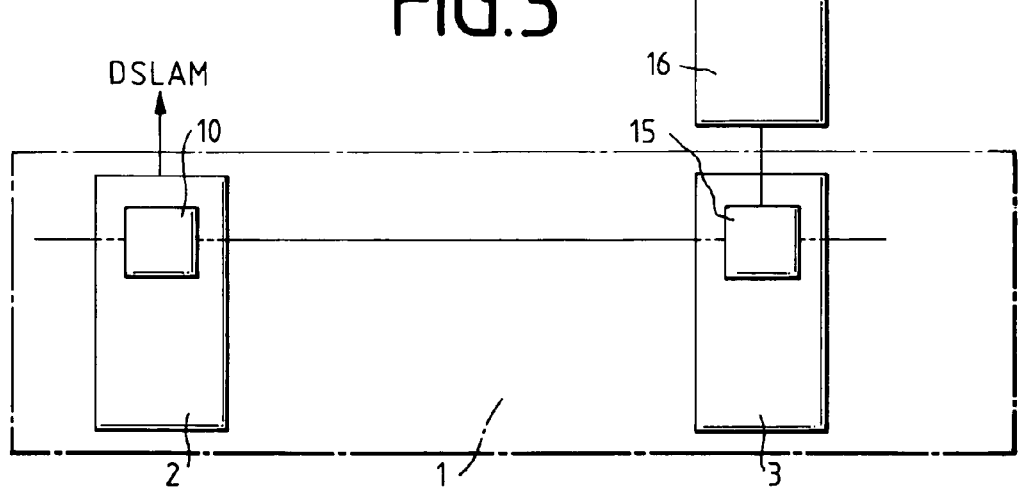
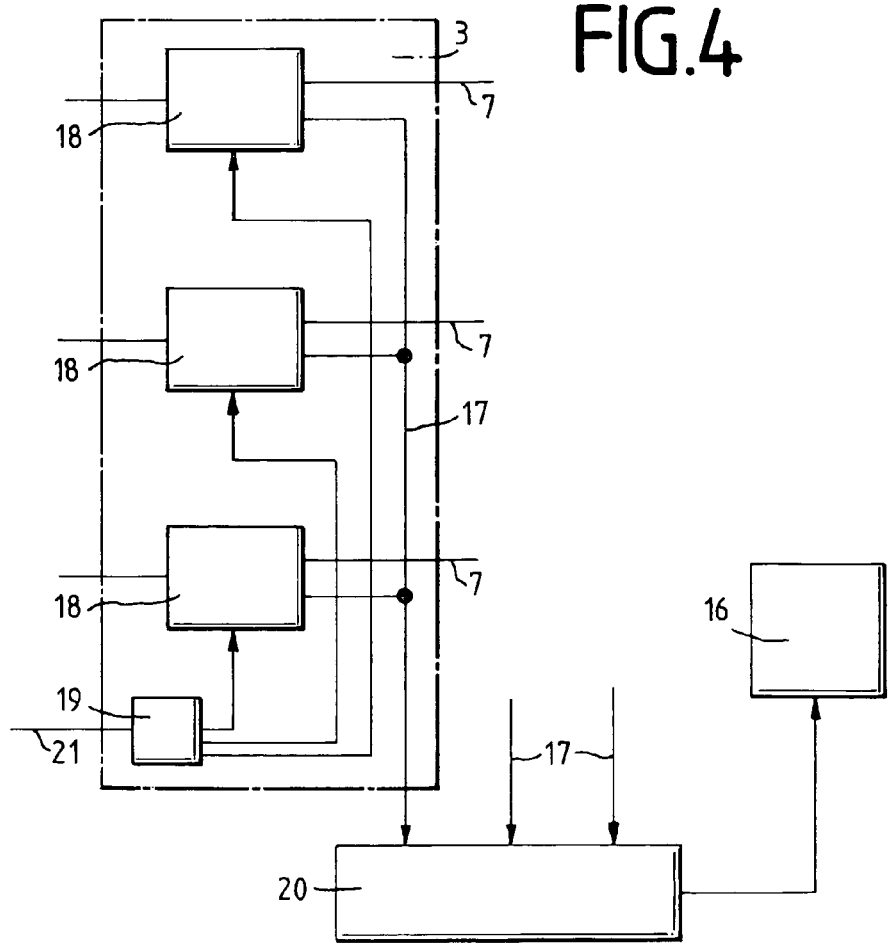

DISTRIBUTOR WITH A TEST ACCESS

The invention relates to a distribution frame with access for testing in accordance with the preamble of patent claim 1, and to a distribution frame connection module for use in such a distribution frame.

Distribution frames of this type, such as main distribution frames or collocation distribution frames, serve the purpose of distributing the wires coming in from a switching center, for example, to the individual subscribers. Distribution frames of this type physically contain a system side and a subscriber side, each of these being formed by at least one distribution frame connection module. Each side generally comprises, however, a large number of distribution frame connection modules of this type. The distribution frame connection modules in this case have input and output contacts. On the system side, for example, the wires from the switching center are connected via the input contacts. The input and output contacts are usually connected directly or else via functional elements. The output contacts on the system side form a jumper side and are preferably in the form of insulation-displacement contacts for this purpose. Correspondingly, the input contacts on the subscriber side are likewise in the form of insulation-displacement contacts and likewise form a jumper side. The electrical connection to the subscriber is then produced via the output contacts on the subscriber side. The wires connected to the input contacts on the system side or the output contacts on the subscriber side should be changed as little as possible, which means that the association is changed by a change being made to the jumper sides.

In order to check the connection, it is known to disconnect the electrical connection by means of a switching element and to switch over to a test unit. These switching elements are arranged in an access matrix such that all the connections can be tested one after the other.

Access matrices of this type are disclosed, for example, in U.S. Pat. No. 6,434,221 B1 or WO 01/93 548. In these publications, these access matrices are illustrated in the form of a block diagram outside the main distribution frame (MDF), although its structure is generally irrelevant. Owing to the abovementioned boundary condition that the wires should be moved as little as possible at the input contacts on the system side and at the output contacts on the subscriber side, the access matrices are physically connected in between the two jumper sides.

Furthermore, DSLs (Digital Subscriber Lines) are becoming increasingly important. This results, in addition, in the splitters for DSLs having to be integrated in the distribution frames too.

FIG. 5 shows a distribution frame 1 of this type according to the prior art, with only the wiring for one wire being shown for reasons of clarity. The distribution frame 1 comprises at least one distribution frame connection module 2 on the system side and at least one distribution frame connection module 3 on the subscriber side. The input side 4 connects the incoming wires 5 from a switching center to the distribution frame 1. Correspondingly, the output side 6 on the subscriber side connects the outgoing wires 7 to the terminals. The output side 8 of the distribution frame connection module 2 and the input side 9 of the distribution frame connection module 3 are the jumper sides, i.e. if a connection is to be changed, this is done by changing the connections between the jumper sides. In order then to include the DSL splitter 10, the wire 11 is connected from the jumper side of the distribution frame connection module 2 to a further distribution frame connection module 12 which is connected on the output side to the DSL splitter 10. One port of the DSL splitter 10 is connected to the DSLAM (Digital Subscriber Line Access Multiplexer) and the other port is connected to a further distribution frame connection module 13. A twin wire 14 is connected to an access matrix 15 via the distribution frame connection module 13, one port of the access matrix 15 being connected to an external test unit 16 and the other port being connected to the distribution frame connection module 3 on the system side.

The invention is therefore based on the technical problem of providing a distribution frame, by means of which the circuitry complexity for including an access matrix is reduced.

The technical problem is solved by the subject matter having the features of patent claims 1 and 11. Further advantageous refinements of the invention are described in the subclaims.

For this purpose, the access matrix is arranged in the distribution frame connection module on the subscriber side or the system side. By this means, it is possible not only to dispense with a distribution frame connection module but also to considerably reduce the necessary wiring from the DSL splitter to the distribution frame connection module on the system side, which results in considerable savings in costs owing to the large number of wires.

The access matrix is preferably formed by relays by means of which the wires may be connected either to a test bus, routed to the test unit, or to the associated output contact of the distribution frame connection module. Relays which are small enough but are still highly reliable may be used.

The relays are preferably arranged on a printed circuit board in the distribution frame connection module.

Furthermore, the access matrix is preferably driven by means of a microprocessor which is preferably arranged on the printed circuit board.

The microprocessor preferably has a common power/control interface which supplies the microprocessor with electrical power and control signals. In principle, power and control may also be in the form of separate interfaces. The test bus in the distribution frame connection module is preferably in the form of a 2-wire bus, which further reduces the wiring required. In particular, this is acceptable since time is not an important factor in the testing.

Two or more distribution frame connection modules are in this case preferably connected to the test unit via a test matrix.

In a further preferred embodiment, DSL splitters are arranged in the electrical connections.

In a further preferred embodiment, the DSL splitters are also arranged in the distribution frame connection modules. In this case, the DSL splitters, together with the access matrix, can be arranged in the same distribution frame connection module. Alternatively, the DSL splitters can be arranged in the distribution frame connection modules on the system side and the access matrix in the distribution frame connection modules on the subscriber side.

Furthermore, overvoltage protection elements are preferably arranged in the distribution frame connection modules on the subscriber side.

The invention is explained in more detail below with reference to a preferred exemplary embodiment. In the figures:

FIG. 1 shows a schematic block diagram of a distribution frame having an integrated access matrix in the distribution frame connection module on the subscriber side, FIG. 2 shows a schematic block diagram having additionally integrated DSL splitters, FIG. 3 shows a schematic block diagram having integrated DSL splitters and access matrix in different distribution frame connection modules, FIG. 4 shows a schematic block diagram of an access matrix, and FIG. 5 shows a schematic block diagram of a distribution frame having an access matrix and DSL splitters (prior art).

FIG. 1 shows a distribution frame 1, comprising distribution frame connection modules 2 on the system side and distribution frame connection modules 3 on the subscriber side. Wires 5 coming from a switching center are connected to the input side 4 of the distribution frame connection module 2. Wires 7 routed from the output side 6 of the distribution frame connection module 3 to subscribers are connected in a corresponding manner. The output side 8 or the input side 9 of the distribution frame connection modules 2 and 3, respectively, form the jumper side of the distribution frame 1. In order to include the DSL splitter 10, the wires 11 are connected to a further distribution frame connection module 12, to the output side of which the DSL splitters 10 are hard-wired. One port of the DSL splitters 10 is connected to in each case one DSLAM and the other to the input side 9 of the distribution frame connection module 3. An access matrix 15 is arranged in the distribution frame communication module 3. Via the access matrix 15, the wires coming from the DSL splitters 10 can be connected either via a test bus 17 to a test unit 16 or to the outgoing wires 7. By integrating the access matrix 15 in the distribution frame connection module 3, a distribution frame connection module and its associated wiring can thus be dispensed with (cf. FIG. 5). Owing to the fact that, generally, a large number of distribution frame connection modules 2, 3 are arranged in one distribution frame, this amounts to a considerably saving per distribution frame 1.

For this purpose, a printed circuit board, fitted with the access matrix 15 and, if required, protection elements, is arranged in the cavity in the housing of the distribution frame connection module 3. The access matrix 15 is located electrically between the input and output contacts. In addition, outputs for the test bus 17 and further inputs for the access matrix 15 must be provided, as will be explained in more detail later.

It should be pointed out, in general, that the terms input and output contacts are only used in this case for explanatory purposes since, physically, the data is transmitted in both directions. Furthermore, it should be pointed out that FIG. 1 shows in each case only the wiring required for one wire. Typically, eight or ten twin wires can be connected by means of one distribution frame connection module.

FIG. 2 shows an alternative embodiment in which, in addition, the DSL splitters 10 are integrated in the distribution frame connection module 3, as a result of which the potential savings are once more doubled.

FIG. 3 shows a further alternative embodiment. In this embodiment, the DSL splitters 10 are integrated in the distribution frame connection module 2 on the system side. This makes it easier, for example, for them to be fitted on and wired to the printed circuit boards, since, in the embodiment in FIG. 2, a great number of components have to be arranged on one printed circuit board, which leads to space problems. As an alternative to the embodiment in FIG. 2, the DSL splitters 10 and the access matrix 15 may also be integrated together in the distribution frame connection module 2. This is particularly advantageous if the network operator has standardized the system side but different distribution frame connection modules 3 are used on the subscriber side.

FIG. 4 shows a schematic block diagram of an access matrix which has a number of switching elements, preferably relays 18, which corresponds to the number of wires to be connected. The relays 18 have a common associated microprocessor 19. All the relays 18 are connected to a test matrix 20 via the test bus 17, and this test matrix is connected to the test unit 16. The microprocessor 19 is supplied with electrical power and control commands via an input 21, this input 21 preferably being in the form of a air interface. The microprocessor 19 controls the relays 18 one after the other such that in each case only one relay 18 is ever connected to the test bus 17. Via the test matrix 20, different distribution frame connection modules 3 can then be multiplexed one after the other using their test bus 17 to the test unit 16.

The input and output contacts of the distribution frame connection modules 2, 3 may be designed differently. All the contacts are preferably in the form of insulation-displacement contacts. However, embodiments are also possible in which the insulation-displacement contacts can be combined, for example with RJ-45 female connectors or other female connectors for plugs which already have the wiring fitted to them.

LIST OF REFERENCE NUMERALS

1) Distribution frame
2) Distribution frame connection module (system side)
3) Distribution frame connection module (subscriber side)
4) Input side (system side)
5) Wires
6) Output side (subscriber side)
7) Wires
8) Output side (system side)
9) Input side (subscriber side)
10) DSL splitters
11) Wire
12) Distribution frame connection module
13) Distribution frame connection module
14) Twin wire
15) Access matrix
16) Test unit
17) Test bus
18) Relays
19) Microprocessor
20) Test matrix
21) Input

The invention claimed is:

1. A distribution frame for telecommunications and data technology, the distribution frame having a system side and a subscriber side, which are each formed by at least one distribution frame connection module, the distribution frame connection modules each having a jumper side by means of which the electrical connections between the system side and the subscriber side can be changed, comprising an access matrix by means of which the electrical connections are routed between the system side and the subscriber side, the electrical connection being passed on by means of the access matrix or else being connected to a test unit via a test bus, wherein test buses of two or more distribution frame connection modules are connected to a test unit via a test matrix, and wherein the test bus of one distribution frame connection module comprises a two-wire cable, and wherein the access matrix is arranged in the distribution frame connection module on the subscriber side or the system side, and wherein a DSL splitter is arranged, with the access matrix, in at least one electrical connection in the same distribution frame connection module.

2. The distribution frame as claimed in claim 1, wherein the access matrix is formed by relays.

3. The distribution frame as claimed in claim 2, wherein the relays are arranged on a printed circuit board.

4. The distribution frame as claimed in claim 1, wherein the access matrix has an associated microprocessor.

5. The distribution frame as claimed in claim 4, wherein the microprocessor has a power/control interface.

6. The distribution frame as claimed in claim 1, wherein the DSL splitter is arranged in the distribution frame connection module on the system side and the access matrix in the distribution frame connection module on the subscriber side.

7. A distribution frame connection module for communications and data technology, comprising a housing in which input and output contacts for the connection of cables and wires are arranged such that they are externally accessible, the housing having a cavity in which functional elements are arranged on at least one printed circuit board, at least the input or output contacts being in the form of insulation-displacement contacts, wherein the functional elements are in the form of an access matrix, the access matrix having an external access to a test bus for testing, by means of which the input and/or output contacts can be connected to a test unit via a test matrix, the test bus including a two-wire cable, wherein, as further functional elements, DSL splitters are arranged on the printed circuit board within the distribution frame connection module including the access matrix.

8. The distribution frame connection modules as claimed in claim 7, wherein, as further functional elements, overvoltage protection elements are arranged on the printed circuit board.

9. The distribution frame connection module as claimed in claim 7, wherein the access matrix has switching elements in the form of relays.

10. The distribution frame as claimed in claim 9, wherein the switching elements have an associated microprocessor.

* * * * *